No. 834,343. PATENTED OCT. 30, 1906.
W. V. TURNER & E. A. WRIGHT.
AIR BRAKE APPARATUS.
APPLICATION FILED FEB. 17, 1905.
2 SHEETS—SHEET 1.
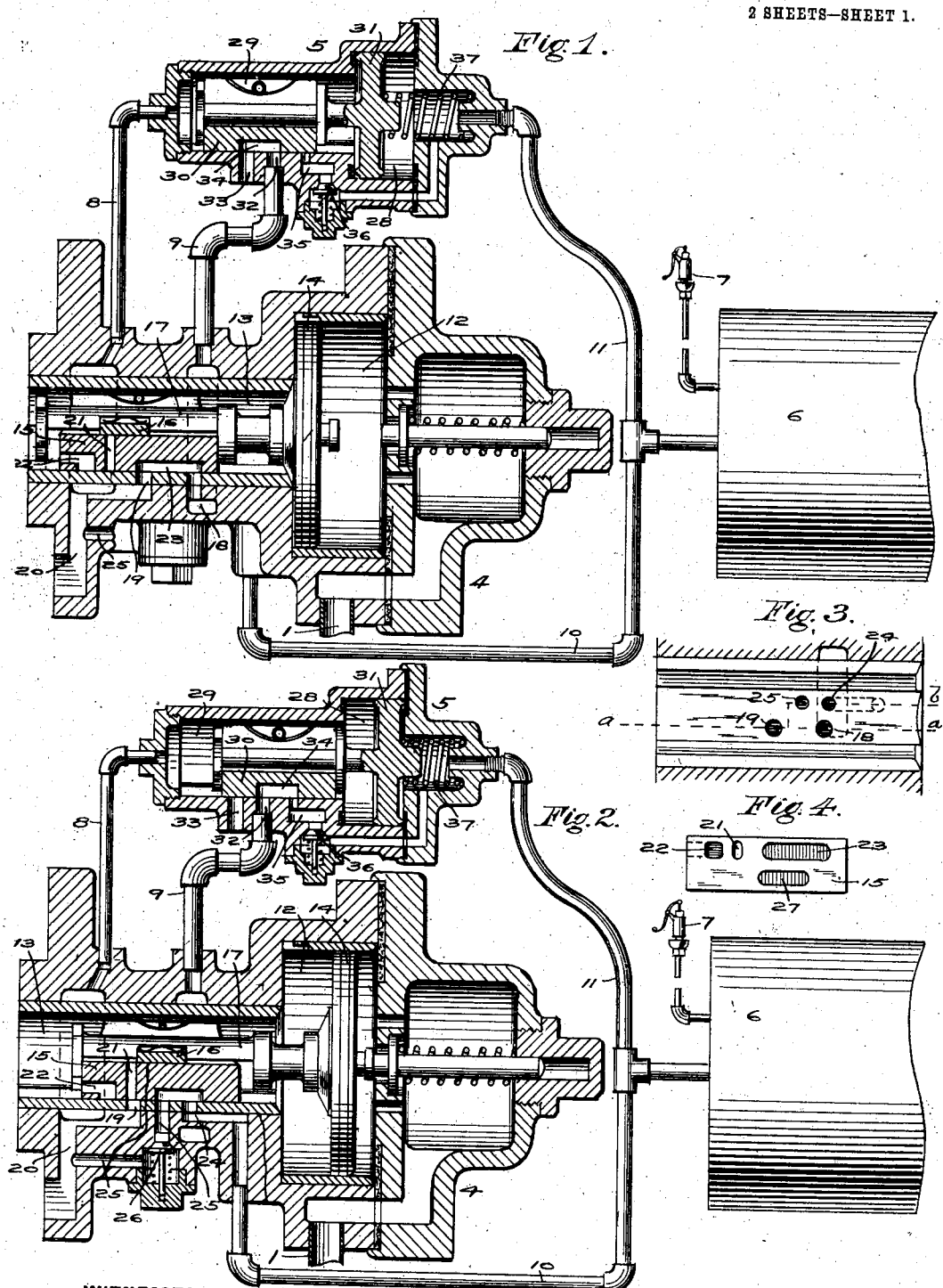

No. 834,343. PATENTED OCT. 30, 1906.
W. V. TURNER & E. A. WRIGHT.
AIR BRAKE APPARATUS.
APPLICATION FILED FEB. 17, 1905.
2 SHEETS—SHEET 2.
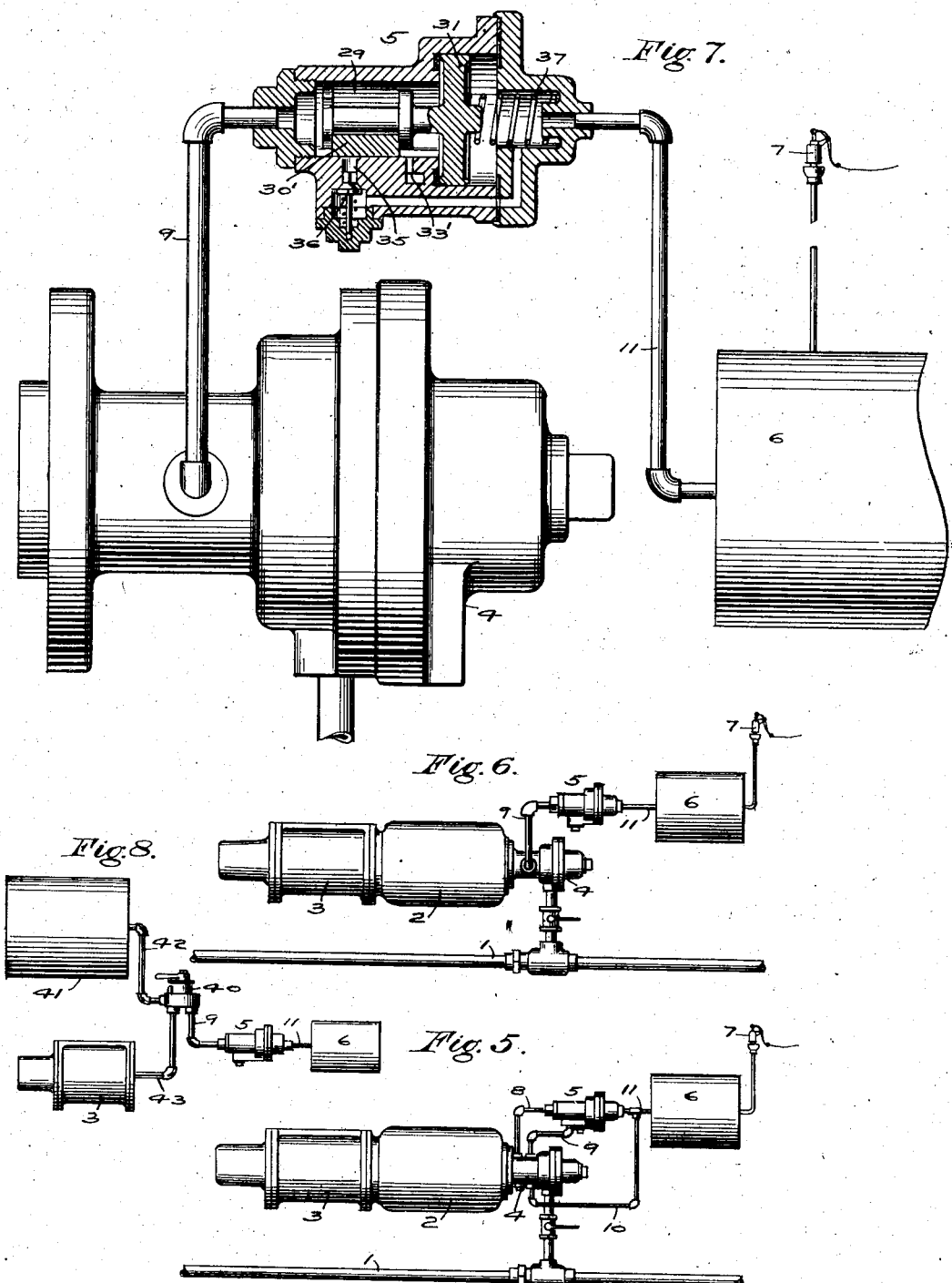

UNITED STATES PATENT OFFICE.

WALTER V. TURNER, OF WILKINSBURG, AND EDWARD A. WRIGHT, OF EDGEWOOD PARK, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

AIR-BRAKE APPARATUS.

No. 834,343.     Specification of Letters Patent.     Patented Oct. 30, 1906.

Application filed February 17, 1905. Serial No. 246,025

*To all whom it may concern:*

Be it known that we, WALTER V. TURNER, residing in Wilkinsburg, and EDWARD A. WRIGHT, residing in Edgewood Park, in the county of Allegheny, State of Pennsylvania, citizens of the United States, have invented a certain new and useful Improvement in Air-Brake Apparatus, of which the following is a specification.

This invention relates to air-brake apparatus, and has for its principal object to economize in the use of compressed air by saving a portion of the air which is ordinarily discharged from the brake-cylinder to the atmosphere in releasing brakes.

One feature of the invention therefore comprises an improved valve device adapted to be connected to a brake-cylinder exhaust-port and operating automatically upon the release of the brakes to supply a portion of the exhaust-air to a reservoir or other receptacle in which the exhaust may be stored and used for operating a whistle or for any other purpose desired.

Another feature contemplates the use of this stored air for securing a quick rise in brake-cylinder pressure at the time the brake is applied and comprises an improved valve mechanism, such as a triple-valve device operating under variations in train-pipe pressure for automatically opening communication from the storage-reservoir to the brake-cylinder.

In the accompanying drawings, Figure 1 shows in sectional view an exhaust-saving valve device and an improved triple-valve device, taken on the line *a a* of Fig. 3, embodying the features of our improvements; Fig. 2, a similar sectional view showing the parts of the valve devices in service-application position, the section of the triple valve being indicated by line *a b* of Fig. 3; Fig. 3, a plan view of the slide-valve seat of the triple-valve device; Fig. 4, a face view of the main slide-valve of the triple-valve device; Fig. 5, a diagram showing this form of our improvement applied to the usual car equipment of automatic air-brake apparatus; Fig. 6, a similar diagram showing a modification; Fig. 7, a view with the modified form of exhaust-saving valve device of Fig. 6, shown in section and connected to the triple-valve exhaust and to the storage-reservoir; and Fig. 8, a diagram showing the exhaust-saving feature of our invention applied to a straight air-brake apparatus.

According to the form of our invention illustrated in Figs. 1 to 5, the preferred form of exhaust-saving valve device 5 is shown connected up with a storage-reservoir 6 and our improved triple-valve device 4 having ports for supplying air from the storage-reservoir to the brake-cylinder 3.

The triple-valve device is in the main of the usual construction, comprising a piston-chamber 12, containing piston 14 and connected to the train-pipe 1, a valve-chamber 13 in open communication with the auxiliary reservoir 2 and containing the main slide-valve 15 and graduating-valve 16, operated by the piston-stem 17.

In the valve-seat are located the exhaust-port 18, leading to the atmosphere, and the brake-cylinder port 19, leading to the brake-cylinder passage 20, while the main slide-valve is provided with service-port 21, emergency-port 22, and exhaust-cavity 23, all of which may be of the well-known standard construction.

According to one feature of our improvement additional ports 24 and 25 are located in the valve-seat, the former leading through a check-valve 26 to the brake-cylinder passage 20 and the latter port communicating through a pipe 10 with the storage-reservoir 6, the slide-valve being provided with an additional cavity 27 for connecting said ports in service-application position.

The exhaust-saving valve device 5 comprises a casing having a piston-chamber 28 and valve-chamber 29, containing piston 31 and valve 30, the opposite sides of the piston or movable abutment 31 being subjected to the pressure from the brake-cylinder through pipe 8 and to the storage-reservoir pressure through pipe 11, with a spring 37 normally acting to move the piston and valve to release position when the fluid-pressures are substantially equal upon opposite sides of the piston. In the valve-seat are ports 32, 33, and 35, communicating, respectively, with the brake-cylinder exhaust through the pipe 9, the atmosphere, and with the storage-reservoir through check-valve 36, the slide-valve 30 being provided with a cavity 34 for connecting the triple-valve exhaust either with the atmosphere through exhaust-port 33 or with the storage-reservoir through port 35.

When the system is being charged up to normal pressure, the valves are in release position, as shown in Fig. 1, and the brake-cylinder is open to the atmosphere through ports 19 23 18, pipe 9, port 32, cavity 34, and exhaust-port 33, while the storage-reservoir is closed at port 24 in the triple-valve device and port 35 in the exhaust-valve device. When a reduction is made in train-pipe pressure for a service application of the brakes, the triple valve moves to service position, Fig. 2, opening communication from the storage-reservoir to the brake-cylinder through ports 24 27 25 and check-valve 26 and from the auxiliary reservoir to the brake-cylinder through 21, 19, and 20, as usual.

It will be noticed that the cavity 27 is arranged to connect the ports 24 and 25 slightly in advance of the opening of the service-ports 21 and 19, so that if there is any compressed air stored in reservoir 6 it may expand into and equalize therewith before the communication from the higher pressure of the auxiliary reservoir is open, the check-valve 26 preventing backflow to the reservoir. The pressure then increases in the brake-cylinder and, acting on the piston 31, moves the same, with the valve 30, to the opposite position, compressing the spring 37 and opening communication from the triple-valve exhaust through cavity 34 and port 35 to the storage-reservoir, in which the pressure is much less than that of the brake-cylinder. Then when the triple valve is moved to release position by an increase in train-pipe pressure for releasing the brakes air from the brake-cylinder flows through the pipe 9, port 32, cavity 34, port 35, and check-valve 36 to the storage-reservoir and equalizes therewith.

As soon as the fluid-pressures are substantially equal on opposite sides of piston 31 the spring 37 returns the piston and valve 30 to release position, in which the cavity 34 connects the ports 32 and 33, and the air remaining in the brake-cylinder immediately exhausts to the atmosphere.

At each application of the brakes, therefore, it will be seen that the compressed air from the the storage-reservoir first equalizes into the empty brake-cylinder, quickly raising the pressure therein to a certain degree, which is immediately increased to the desired amount by air from the auxiliary reservoir. Then as the brakes are released this higher brake-cylinder pressure equalizes back into the storage-reservoir, after which the remainder escapes to the atmosphere. In this manner a portion of the compressed air which would otherwise be wasted at each release of the brakes is stored up and used for assisting in the next application, thereby effecting a great saving in compressed air.

According to the modification shown in Figs. 6 and 7 the pressure from the brake-cylinder exhaust-pipe 9 is admitted directly to the chamber 29 and against one side of piston 31 of the exhaust-controlling valve device and operates the valve 30' to open the port 35, leading to the storage-reservoir, and to close the exhaust-port 33', which with this form of valve is preferably somewhat restricted in order to insure the accumulation of pressure from the exhaust of the brake-cylinder on the piston 31 to cause the movement of the piston and valve to the opposite position upon the release of the brake. As the brake-cylinder pressure then equalizes into the storage-reservoir, the spring 37 returns the piston and valve 30' to release position, whereupon the compressed air remaining in the brake-cylinder escapes to the atmosphere through exhaust-port 33'.

The compressed air which is stored up in the reservoir 6 may also be used for operating a whistle 7 or for any other purpose desired It will now be apparent that either form of exhaust-controlling valve may be used in connection with an ordinary triple-valve device of an automatic air-brake, as indicated in Figs. 6 and 7, or may, if desired, be employed upon a straight air-brake apparatus, as illustrated in Fig. 8, in which a straight air-brake valve 40 is shown for controlling the supply of compressed air from a main reservoir 41 and pipe 42 to pipe 43, leading to the brake-cylinder 3, and for also controlling communication from the brake-cylinder pipe 43 to the exhaust-pipe 9, to which our improved exhaust-controlling valve 5 and storage-reservoir 6 may be connected.

In either case it will be evident the air-pressure from the brake-cylinder operates the exhaust-controlling valve to open communication from the brake-cylinder to the storage-reservoir and after the equalization of the pressures to discharge the air remaining in the brake-cylinder to the atmosphere.

Having now described our invention, what we claim as new, and desire to secure by Letters Patent, is—

1. In an air-brake, the combination with a storage-reservoir independent of the main brake-cylinder-supply reservoir and a brake-cylinder having an exhaust-port, of automatic means for controlling communication from the brake-cylinder exhaust to the storage-reservoir.

2. In an air-brake, the combination with a storage-reservoir and brake-cylinder having an exhaust-port, of a valve device operated by pressure from the brake-cylinder for controlling communication from the exhaust to the storage-reservoir.

3. In an air-brake, the combination with a storage-reservoir and a brake-cylinder having an exhaust-port, of a valve device operated by pressure from the brake-cylinder for controlling communication from the exhaust to the storage reservoir, and from the exhaust-port to the atmosphere.

4. In an air-brake, the combination with a storage-reservoir and a brake-cylinder having an exhaust-port, of a valve device operated by the opposing pressures of the brake-cylinder and storage-reservoir for controlling communication from the exhaust-port to the reservoir.

5. In an air-brake, the combination with a storage-reservoir and a brake-cylinder having an exhaust-port, of a valve device operated by the opposing pressures of the brake-cylinder and storage-reservoir for controlling communication from the exhaust-port to the reservoir, and from the exhaust-port to the atmosphere.

6. In an air-brake, the combination with a brake-cylinder, of an automatic valve device operating upon the release of the brake after a service application for saving a portion of the exhaust from the brake-cylinder.

7. In an air-brake, the combination with a triple valve and brake-cylinder, of a valve device operated by pressure from the brake-cylinder for saving and storing a portion of the exhaust from the brake-cylinder.

8. In an air-brake, the combination with a triple valve, brake-cylinder and storage-reservoir, of a valve device operated by the opposing pressures of the brake-cylinder and storage-reservoir for controlling communication from the triple-valve exhaust-port to the storage-reservoir.

9. In an air-brake, the combination with a brake-cylinder and storage-reservoir, of a valve for controlling communication from the brake-cylinder exhaust to the storage-reservoir and to the atmosphere, a movable abutment subject to the opposing pressures of the brake-cylinder and storage-reservoir for operating said valve, and a spring for normally moving said valve to its release position.

10. In an air-brake, the combination with brake-cylinder, a storage-reservoir independent of the auxiliary reservoir, and means for supplying air from the brake-cylinder exhaust to said storage-reservoir, of a valve device operated by variations in train-pipe pressure for controlling communication from the storage-reservoir to the brake-cylinder.

11. In an air-brake, the combination with a brake-cylinder, a storage-reservoir independent of the auxiliary reservoir, and a valve device for supplying air from the brake-cylinder exhaust to the storage-reservoir, of a triple-valve device having ports for opening communication from the storage-reservoir to the brake-cylinder in service position.

12. In an air-brake, the combination with a brake-cylinder, a storage-reservoir, and a valve device operated by pressure from the triple-valve exhaust to the storage-reservoir, of a triple-valve device for supplying air from the storage-reservoir and the auxiliary reservoir to the brake-cylinder.

13. In an air-brake, the combination with a brake-cylinder and a storage-reservoir, of a valve device operated by pressure from the brake-cylinder for controlling communication from the brake-cylinder exhaust to the storage-reservoir, and means operated by variations in train-pipe pressure for controlling communication from the storage-reservoir to the brake-cylinder.

14. In an air-brake, the combination with a train-pipe, auxiliary reservoir, brake-cylinder, and a storage-reservoir independent of the auxiliary reservoir, of a valve device operated by pressure from the brake-cylinder for controlling communication from the brake-cylinder exhaust to the storage-reservoir, and a valve mechanism operating upon a reduction in train-pipe pressure to open communication from the storage-reservoir to the brake-cylinder.

In testimony whereof we have hereunto set our hands.

WALTER V. TURNER.
EDWARD A. WRIGHT.

Witnesses:
R. F. EMERY,
J. B. MACDONALD.